N. THOMPSON.
Improvement in Molds for Casting Carved Pipe.
No. 128,264. Patented June 25, 1872.
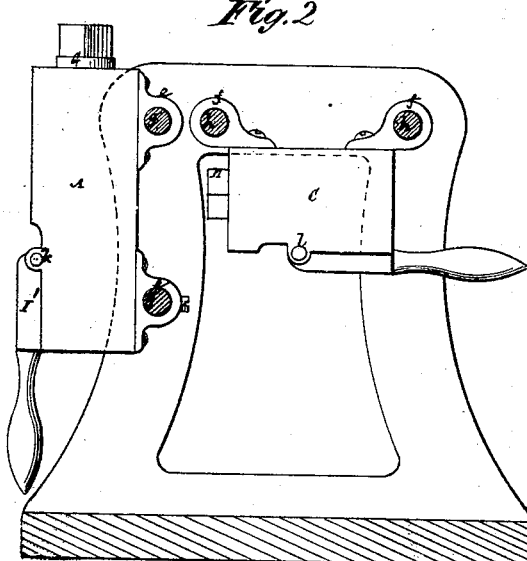
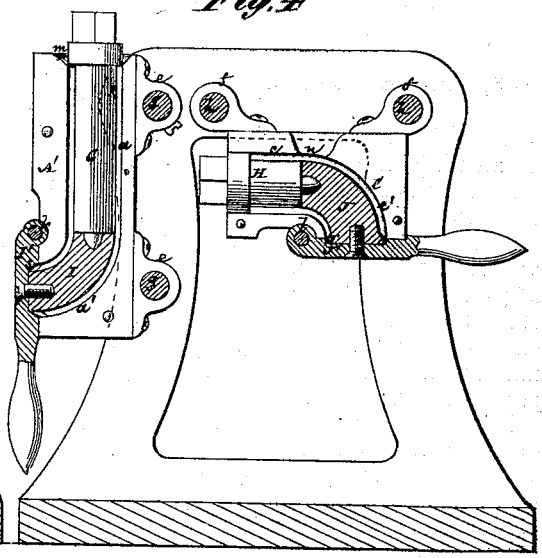
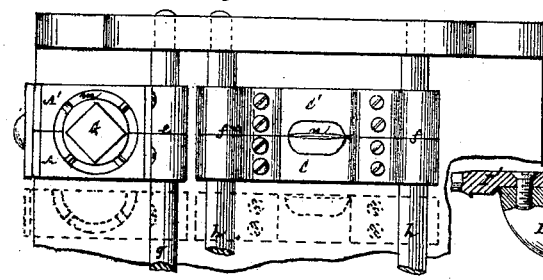
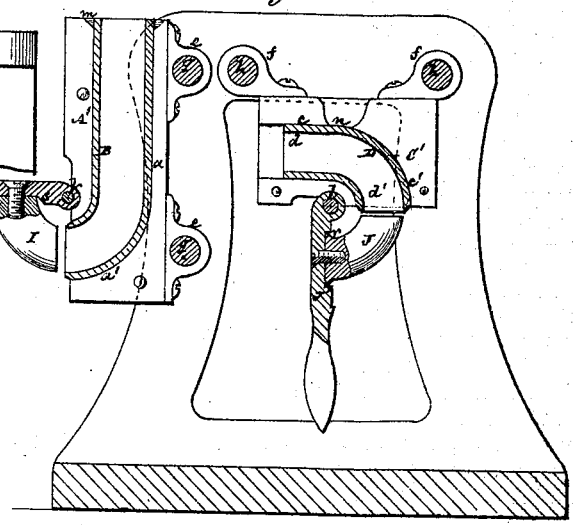
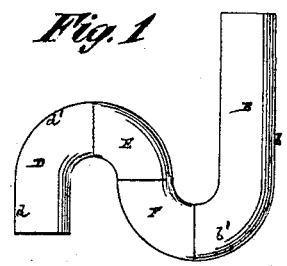
Witnesses:

UNITED STATES PATENT OFFICE.

NATHAN THOMPSON, OF BROOKLYN, NEW YORK.

IMPROVEMENT IN MOLDS FOR CASTING CURVED PIPES.

Specification forming part of Letters Patent No. 128,264, dated June 25, 1872; antedated June 4, 1872.

*To all whom it may concern:*

Be it known that I, NATHAN THOMPSON, of Brooklyn, in the county of Kings and State of New York, have invented a new and useful Improvement in Apparatus for making Curved or partly-Curved Pipes; and I do hereby declare that the following is a full, clear, and exact description of the same, reference being had to the accompanying drawing forming part of this specification.

This invention relates to apparatus for making pipes from various materials or substances in molds by means of cores, about or around which latter the substance to be worked is run or placed, while in a fluid or plastic state, through the application of moisture or heat, and afterward allowed to solidify in the molds. The invention consists in a novel apparatus or combination of devices for thus making curved pipe or partly-curved pipe, the same comprising mainly a curved core or cores pivoted or hinged so as to be capable of being swung to or from their places, in combination with a mold or molds of corresponding configuration, within and out of which said cores are adjusted or swung to or from the curved or partly-curved pipe, and to admit of its removal or opening the molds. These cores are preferably riveted or hinged to the molds themselves, and the molds made to open and close with a sliding motion on rods or guides in directions parallel with the axis of the cores' pivot. When making partly-curved pipe, then additional straight cores are introduced within the molds to form a junction with the inner ends of the curved cores, so as to make pipe which is straight for a portion of its length but curved at its end. The molds and cores may be made of any suitable material that will allow of the solidifying of the substance to be made into pipe, within and about them, and of the removal of the cores and molds from the pipe. By thus making curved or partly-curved pipe, much labor is saved and better or more regular pipe is produced, with fewer joints for a given length of pipe made up of a series of sections, or with the joints better arranged; and said invention will be found particularly advantageous in plumbers' work, as in the case of traps used for sinks, water-closets, and other purposes; which application of its use will be selected in the following description by way of illustration, and the pipes thus made be referred to as lead pipes.

Having thus specified the object and nature of the invention, its description will be proceeded with in reference to the accompanying drawing.

Figure 1 represents the side view of a lead-pipe trap made up in sections by apparatus or devices in accordance with the invention; Fig. 2, a side view of such apparatus fitted with molds and cores for making two of the sections of said trap, the one side frame of the apparatus being removed; Fig. 3, a partial plan of the same, and Figs. 4 and 5, vertical sections through the centers of the molds, showing the cores in position for making the pipe-sections, and as removed for extraction of said pipe-sections on opening the molds.

Similar letters of reference indicate corresponding parts throughout the several figures of the drawing.

A A' represent a longitudinally-divided mold suitable for making the pipe-section B of the trap, shown in Fig. 1; and C C', a mold adapted to making the pipe-section D of said trap. These molds are partly curved and partly straight, the mold A A' being straight at its portion $a$, to correspond with the straight portion $b$ of the pipe section B, and curved at $a'$ to correspond with the curved portion $b'$ of such pipe section, and the mold C C' being similarly straight for a part of its length, as at $c$, and curved at $c'$ to conform to the straight and curved portions $d$ $d'$ of the pipe section D. Similarly-divided molds, but wholly curved, are used, although not here shown, for making the pipe sections E and F of the trap, the operation being the same, only omitting the straight cores hereinafter referred to.

The molds A A' and C C', or the one section of either of them, is or are arranged so as to be capable of sliding, by lugs $e$ and $f$, on rods or guides $g$ $h$, to facilitate the opening and closing of the molds for extraction of the pipe made in them, and adjustment of the molds. Fig. 3 represents, by dotted lines, one section of the molds as opened or slid away from their adjacent section. When the molds are closed they are securely held or locked by any suitable clamps. For making partly-curved pipe, as is here illustrated, straight cores G and H are used in addition to the curved cores I and J, the former making a junction with the latter at their inner ends and centering themselves therein or on. These straight cores G and H may be slid or drawn out in straight courses from their respective molds, or from out of the pipe sections they serve to make, and, by themselves, involve no novelty of action; but to make the curved portions $b$ and $d'$ of the pipe sections B and D, or to make wholly curved sections, the curved cores I and J, which correspond in curvature with the portions $a'$ $c'$ of the molds, are hinged or pivoted in line with the centers from which said curved portions of the molds are struck. This is done by securing the cores I and J in a detachable manner, to admit of them being replaced by others when required, to lids or handles I' J', pivoted, as at $k$ and $l$, to the molds, with provision, as regards the pivot-pins, for the one section of either mold to be slid away from the other section when opening the molds. The straight core H is here represented as closing the one outer end of its mold C C', the fluid lead to make the pipe section D being introduced at an opening, $n$, and the other straight core G being shown as leaving an opening, $m$, at the one outer end of its mold A A', for introduction of the metal. The other outer ends of the molds are closed by the lids I' J'. In Fig. 4 the straight and curved cores G H I J are represented as in their places in the closed molds, ready to receive the metal around them; and in Fig. 5 as drawn out of the molds and the pipe sections B and D, ready to be removed on opening the molds, the curved cores I J merely being swung back or out. The outer ends of the curved cores, or portions of the molds they fit, are made beveling, as at $r$ $s$, in suitable directions, to provide for fit of the pipe sections made by them in adjacent sections, which are reversely beveled at their ends for the purpose, and so that after the several sections of the trap or pipe are fitted together they may be readily united by soldering round the joints thus formed. Prior to this the pipe sections are suitably cut or dressed to remove the surplus metal at the gates or openings in filling the molds, and to prepare them for their after connections with any required extension of the pipe.

Not only lead, but other soft or even hard metal pipes or elbows, likewise earthenware and other pipes or elbows made from plastic material, may be formed with equal facility by the hinged cores and molds to correspond, the materials of which the molds and cores are made being modified to suit. For making curved or partly curved lead pipe the cores and molds may be formed of iron or brass, suitably dressed to present smooth surfaces.

What is here claimed, and desired to be secured by Letters Patent, is—

1. The hinged curved core or cores, in combination with a mold or molds of like curvature, substantially as and for the purpose herein set forth.

2. The combination of the hinged curved core I or J, and straight core G or H, with the partly-curved and partly-straight mold A A', or C C', essentially as described.

3. The divided mold A A' or C C', provided with lugs $e$ or $f$, in combination with the guides $g$ or $h$, on which one or both mold-sections are fitted to slide, substantially as specified.

NATHAN THOMPSON.

Witnesses:
FRED. HAYNES,
HENRY T. BROWN.